J. W. Douglas,
Hose Coupling.
Nº 64,292.  Patented Apr. 30, 1867.

Witnesses:
Theo Fisch
T. A. Jackson

Inventor:
J. W. Douglas
Per Munn & Co
Attorneys

United States Patent Office.

JOSEPH W. DOUGLAS, OF MIDDLETOWN, CONNECTICUT, ASSIGNOR TO W. & B. DOUGLAS, OF SAME PLACE.

Letters Patent No. 64,292, dated April 30, 1867.

IMPROVEMENT IN HOSE-COUPLINGS.

*The Schedule referred to in these Letters Patent and making part of the same.*

TO ALL WHOM IT MAY CONCERN:

Be it known that I, JOSEPH W. DOUGLAS, of Middletown, in the county of Middlesex, and State of Connecticut, have invented a new and improved Coupling for Hose and Pumps; and I do hereby declare that the following is a full, clear, and exact description thereof, which will enable those skilled in the art to make and use the same, reference being had to the accompanying drawings, forming part of this specification.

The nature of my invention consists in constructing, in a simple, cheap, and novel manner, a coupling which may be used for coupling hose or pumps to their base or pipes or tubes. It more particularly consists in a peculiar and novel lock which holds the coupling, the sections of which may be quickly adjusted and secured in their position by means of an eccentric-nut, which renders it tight, strong, and not liable to wear and get out of order. The advantages my invention possesses over the common coupling are, that it is so readily adjusted, while, by the common screw-coupling, in case of fire all is bustle and confusion, the attendant is in a hurry, and is very liable to get the threads of the screw crossed, and by this means great delays are often caused in getting the hose coupled, and the hose in order for the engine to work, and the fire gaining great advantages over its contending element. In the accompanying drawings—

Similar letters of reference indicate corresponding parts.

Figure 1:
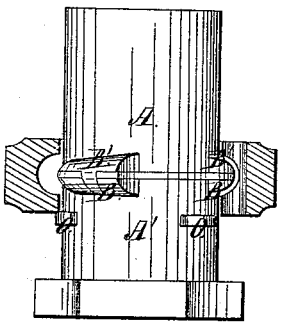
Figure 1 is a longitudinal sectional elevation of my coupling, taken from the line $y\ y$.
Figure 2:
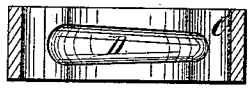
Figure 2 is a longitudinal sectional elevation of the nut, from the line $x\ x$.
Figure 4:
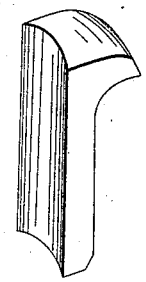
Figure 4 is a perspective view of the locking key.
Figure 3:
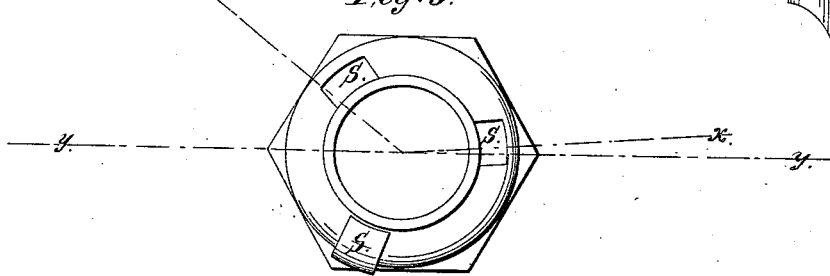
Figure 3 is a top plan view of the nut.

A A' represent the two sections constituting my coupling, which may be made of brass or any other suitable metal. Upon the section A' are lugs B, which are provided with a groove running longitudinally with the said section. The section A is also provided with lugs, B', similar to those in section A', provided with a tongue that corresponds and fits into the grooves upon the section A'. Between the two sections I put any suitable packing, made of leather or rubber. When the said sections are joined, the lugs or projections correspond and form one lug, which, it will be observed, taper or lessen as they pass around to the right. C represents a longitudinal section of the nut or box, which is also made of suitable metal, and provided with a concave groove, D, which is made to precisely correspond and to fit over lugs B B', and which tapers to correspond with the said lugs, as seen in the drawings. This nut or box C is also provided with slots S S S, of sufficient capacity to allow the nut to pass over the said lug; and when the sections or nut is turned, the lugs pass into the concave groove D, and become tight, and may, if necessary, be keyed in any of the grooves S, so as to add still more to its security. O O are lugs made upon the section A', for the purpose of keeping the nut in its place upon the section of the coupling.

The operation is simple and easy. When the sections are apart, and it is desired to join them, the nut is brought to correspond with the lugs, when the ends of the two sections will meet, and the nut is then turned a short distance, and by means of the incline of the lugs corresponding with the concave grooves, the two sections are brought tight and held firmly together, thus rendering it one of the most simple, perfect, and convenient couplings now in use.

Having thus described my invention, what I claim as new, and desire to secure by Letters Patent, is—

1. The inclined lugs B B', provided with corresponding groove and tongue, for the purposes and substantially as described.

2. I claim the inclined concave grooved nut C, in combination with the lugs B B', substantially as described.

JOS. W. DOUGLAS.

Witnesses:
JOHN L. S. ROBERTS,
WM. T. ELMER.